United States Patent [19]

Sakamoto

[11] 4,262,489
[45] Apr. 21, 1981

[54] METHOD OF AND APPARATUS FOR PRODUCING PURE WATER

[75] Inventor: Shigetoshi Sakamoto, Aichi, Japan

[73] Assignee: Hoshizaki Electric Co., Ltd., Toyoake, Japan

[21] Appl. No.: 98,197

[22] Filed: Nov. 27, 1979

Related U.S. Application Data

[63] Continuation of Ser. No. 748,535, Dec. 8, 1976, abandoned.

[30] Foreign Application Priority Data

Jun. 5, 1976 [JP] Japan .................................. 51-65931

[51] Int. Cl.³ .......................... B01D 9/04; C02F 1/22
[52] U.S. Cl. ........................................ 62/124; 62/348
[58] Field of Search .................. 62/347, 348, 123, 124

[56] References Cited

U.S. PATENT DOCUMENTS

| | | | |
|---|---|---|---|
| 1,931,347 | 10/1933 | Gay | 62/124 |
| 2,340,721 | 2/1944 | Whitney | 62/123 |
| 2,657,555 | 11/1953 | Wenzelberger | 62/123 X |
| 2,949,752 | 8/1960 | Bayston | 62/347 X |

*Primary Examiner*—William E. Wayner
*Attorney, Agent, or Firm*—Wenderoth, Lind & Ponack

[57] ABSTRACT

A process comprises steps of circulating raw water into an ice making mechanism for freezing the water into the ice, harvesting with wash the formed ice and transferring the ice to a receptacle having a heating means for entirely or partially melting the ice to obtain pure water and catalyzing the resulting pure water with a selected nutritious substance before, during or after storing of the pure water. The apparatus is also provided.

7 Claims, 6 Drawing Figures

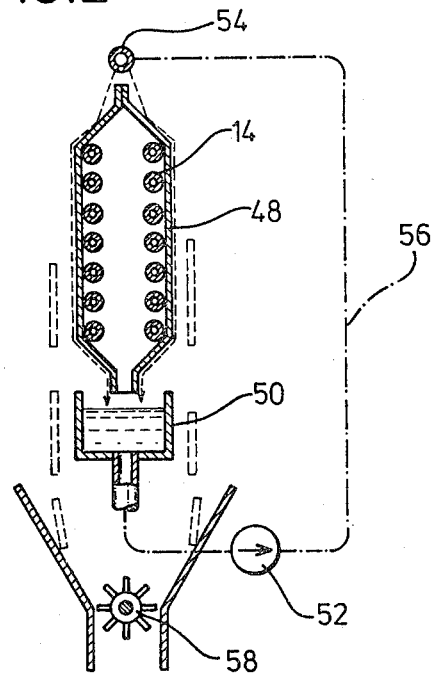
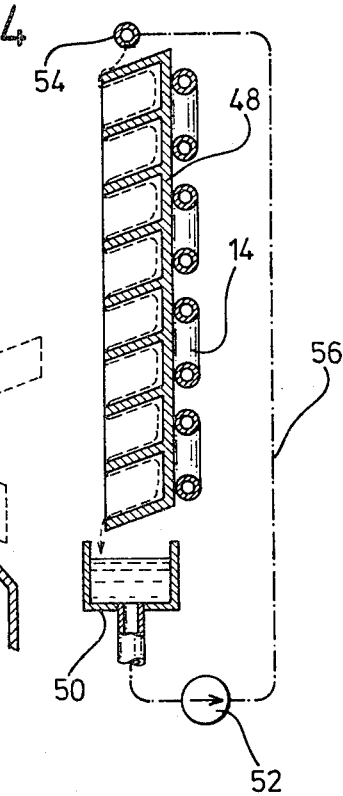
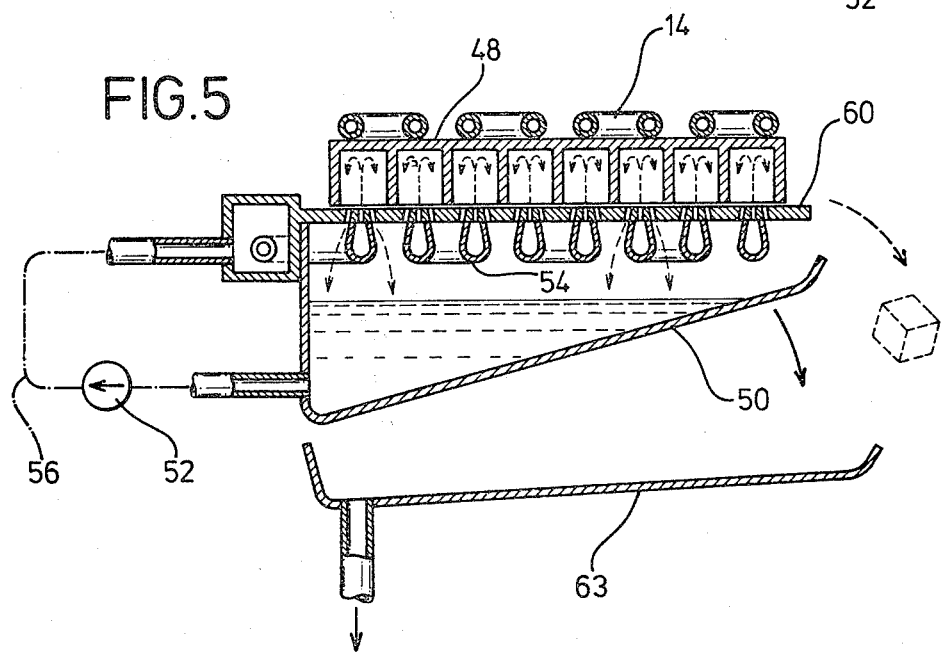

METHOD OF AND APPARATUS FOR PRODUCING PURE WATER

This application is a continuation of application Ser. No. 748,535, filed Dec. 8, 1976, now abandoned.

BACKGROUND OF THE INVENTION

This invention relates to a metod of and an apparatus for preparing pure water by freezing raw water into an ice mass for elimination of impurities therefrom and subsequently heating the ice mass for melting to obtain the pure water for the convenient supply to the customers.

Recently, the demand for water has been greatly increasing despite a poor supply of water with the result of supplying water of inferior quality as drinking water for home use. To resolve many difficulties in obtaining pure water there have been proposed many methods for purification of water such as a chemical treatment process with an ion exchange, a biological treatment process by an aeration, a distillation process and a freezing process among which the freezing process is preferably adopted to prevent the propagation of bacteria in the water during storage.

In the conventional freezing process which is essentially used in converting sea water into fresh water, a refrigerant is blown into the sea water for instant freezing to obtain a mixture of ice flakes and salt water and then the ice is segregated from the salt water for subsequent washing and thereafter the ice flakes are melted to obtain fresh water. This conventional process is effective for the continuous purification of water, notwithstanding the fact that the device for removing the salt component from the surface of the ice becomes complicated.

The inventor, after intensive studies to provide a convenient way to obtain purified water, has discovered a simple system for supplying purified water which comprises the steps of circulating the raw water into an ice making mechanism for freezing to obtain an ice mass with elimination of impurities, removing the formed ice mass from the ice making mechanism with washing, harvesting the resultant ice in a receptacle having a heating means for melting all or a part of the ice into the desired pure water, leading the pure water together with a part of the ice to a water tank to retain the water tank at a desired low temperature and supplying a desired amount of the pure water from the water tank through a valve means.

SUMMARY OF THE INVENTION

A general object of the present invention is to provide a method of and an apparatus for supplying pure water which comprises the steps of circulating raw water into an ice making mechanism to eliminate impurities, collecting with wash the resulting ice, heating the ice for melting into pure water and storing a supply of the pure water in a water tank at a desired low temperature.

In order to achieve this purpose, the process according to the present invention is characterized by comprising the steps of circulating raw water into an ice making mechanism for freezing the water into cubic ice with elimination of impurities, harvesting the resulting ice with wash and transferring the ice to a receptacle having a heating means for entirely or partially melting the ice to obtain pure water, storing the pure water at a relatively low temperature and supplying a desired quantity of the stored pure water.

A predetermined highest water level of the pure water in the tank is detected to interrupt the ice making operation and also a predetermined lowest water level is detected to restart the ice making operation.

When the process according to the invention is practiced the impurities as well as bleaching powder are almost eliminated from the water and if such purified water is stored at a room temperature, undesired bacteria will likely be propagated.

In order to avoid such defect and to retain the pure water at an appropriate low temperature in accordance with the present invention, there is proposed a way of leading a part of the semi-molten ice into the water tank, a way of passing a part of the ice directly into the water tank or a way of refrigerating the water tank from outside by means of an appropriate cooling system.

In order to enrich the nutritive value of the pure water obtained in accordance with the present invention, substances advantageous to human health, for example, calcium, magnesium, potassium and the like may be selectively added to the pure water.

Accordingly, another aspect of the present invention is to provide a method of and an apparatus for providing pure water containing substances advantageous to human health.

To achieve the foregoing purpose, the process according to the present invention comprises steps of circulating raw water into an ice making mechanism for freezing the water into ice, harvesting with wash the formed ice and transferring the ice to a receptacle having a heating means for entirely or partially melting the ice to obtain pure water and catalyzing the resulting pure water with a selected nutritious substance before, during or after storing of the pure water.

To carry out the process according to the invention for elimination of the impurities with sufficient ice making efficiency, it is preferred to use an ice making mechanism which is so constructed that a desired amount of water is continuously circulated to the ice making position by a pump to increase the ice making rate while discharging the residual water with impurities each ice making cycle.

In accordance with the present invention, an apparatus for supplying pure water comprises an ice making mechanism for circulating the raw water therethrough for freezing and subsequently removing the formed ice with washing, an ice harvesting chamber with a heating means for melting the ice mass completely or incompletely, a water tank for storing the water at an appropriate low temperature, a means for detecting a water level in the tank to energize or deenergize the ice making mechanism and a means for conveniently discharging the stored pure water from the water tank.

A storing chamber is preferably positioned under the ice making mechanism to harvest the formed ice mass and is provided at its bottom portion with a heating means which is comprised of a condensing tube derived from the freezing system. This heating means achieves the melting of the ice mass as well as the condensation of the refrigerant in the freezing system simultaneously. Beneath the ice storing chamber is arranged a pure water tank to receive the pure water with the semi-molten ice mass so that the water in the water chamber is always retained at an appropriate temperature for the desired period. The ice storing chamber at its bottom is provided with a cell for receiving a part of the formed ice mass which is extended into the pure water tank for retaining the chamber at an appropriate low temperature.

Further, a valve means provided in the discharging pipe from the pure water chamber may be operated under the control of a coin operated means to provide an automatic pure water dispensing machine.

The pure water and the ice mass may be supplied together or separately by a conduit from the ice chamber independent of the discharge pipe from the pure water tank for supplying the pure water.

Other objects and advantages of the invention will become apparent from the following disclosure taken in conjunction with the accompanying drawing showing illustrative embodiments of the invention. The principles of the invention may be applied to all types of the ice making machines and accordingly it is not intended to limit the invention to the ice making mechanism of the specific type shown in the drawing.

BRIEF DESCRIPTION OF THE DRAWINGS

FIGS. 2 to 6 are fragmentarily sectioned views of the ice making mechanisms of preferred embodiments.

DESCRIPTION OF THE PREFERRED EMBODIMENTS

Figure 1:
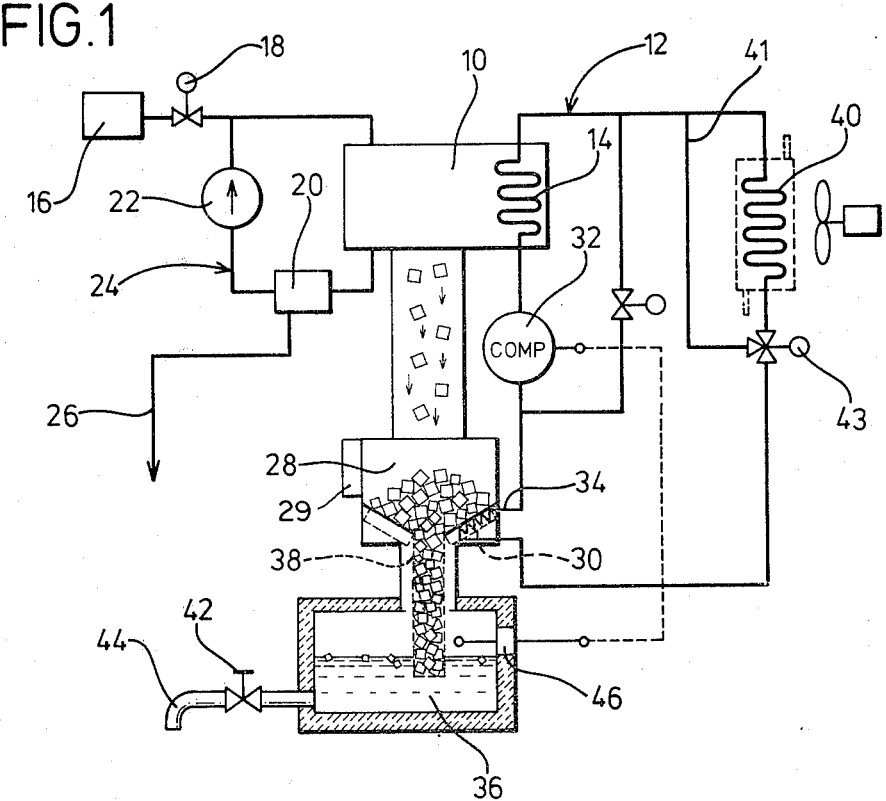
FIG. 1 is a pictorial view illustrative to an apparatus for embodying the method according to the invention.

In FIG. 1, the reference numeral 10 represents an ice making mechanism having a freezing portion which is refrigerated by an evaporator 14 of a freezing system 12. To the freezing portion a desired amount of water is supplied from a water supply source 16 through an automatic valve 18 and then led into a water tank 20 which is communicated with the ice forming portion through a pump 22 to provide a water circulation system 24.

It is preferred to use an ice making mechanism in which the raw water is supplied in the form of a fountain or upwardly moving stream or a downwardly moving stream to grow the ice gradually. By the action of the pump, the water is circulated through the ice forming portion to grow the ice gradually as hereinbefore described while leaving impurities in the circulating raw water. After completion of freezing, the residual water with a high concentration of impurity is evacuated from the water tank 20 through a discharge pipe 26 while a hot gas of the freezing system 12 is supplied to the evaporator 14 to separate the ice mass from the freezing portion. The ice mass thus separate is harvested in an ice chamber 28 arranged under the ice making mechanism 10 where the ice mass is melted by means of an appropriate heating means 30. In one embodiment of the invention, the heating means 30 comprises a condensing pipe 34 which is derived from an outlet of a compressor 32 arranged in the freezing system 12 and disposed in the bottom of the ice chamber 28 to achieve the melting of the ice mass as well as the condensation of the refrigerant passing through the condensing pipe 34. The molten pure water with the partially or semi-molten ice mass drops through a cell 38 provided at the bottom of the ice chamber 28 into a water tank 36 where the pure water is stored at an appropriate temperature for the desired period, the cell 38 receiving the ice mass extending into the stored pure water. It will be appreciated that the water tank 36 is preferably coated with an appropriate heat insulating material. Further, when the ice chamber 28 is vacant or the atmospheric temperature is extremely elevated to disturb the condensation of the refrigerant in the condensing pipe it is preferable to provide a second condensor 40 in the freezing system 12 for operation under the air cooling or the water cooling and also to provide a branch pipe 41 having at its branched connection a three way valve 43 for automatically charging the path for the refrigerant sensitive to the atmospheric temperature as best shown in FIG. 1. Alternatively, before the condensing pipe 34 of the freezing system 12 arranged in the ice chamber 28 is provided a main condenser of the freezing system 12 to achieve the melting of the ice mass as well as the condensation of the refrigerant effectively.

An outlet pipe 44 extends from one side of the water tank 36 through a valve means 42 which is manually or automatically operated to remove the pure water from the water tank 36. The water tank 36 is preferably provided with a water level detector 46 which detects a predetermined upper water level of the pure water in the tank to suspend the operation of the freezing system 12 thereby stopping the ice making operation and also detects a predetermined lower water level of the pure water in the tank to reoperate the freezing system 12 for the ice making operation through a controlled circuit.

Further, in accordance with the present invention, in order to facilitate the melting of the ice mass, another convenient heating means such as an electric heater or a steam heater may be used alone or together with the condensing pipe as hereinbefore described.

Moreover, an ice supply means 29, such as a pipe may be mounted on the ice tank 28 in addition to the outlet pipe 44 so that the ice mass may be supplied separately from the pure water if desired. The valve means 42 provided in the outlet pipe 44 may be associated with a coin controlled means (not shown) to provide a pure water supply dispensing machine.

In accordance with the present invention, undesired impurities are eliminated from the raw water when circulated in the ice making mechanism and the ice mass or the cubic ice when removed from the freezing portion is subjected to melt-washing, i.e. the surface of the ice is washed by melting to eliminate all impurities deposited on the surface of the ice so that extremely pure water may be obtained.

The ice making mechanism as illustrated in FIG. 2 is comprised of a vertical freezing plate 48, a water tank 50 disposed under the plate 48 for storing the raw water of a predetermined quantity and a water circulation system 56 through which the water in the raw water tank 50 is circulated through a pump 52 and supplied through a dispersion nozzle 54 onto the top of the freezing plate 48. To remove the formed ice from the freezing plate 48, a hot gas is passed through the evaporator 14 to drop the ice plate downwardly by its own gravity for fine division by means of an appropriate crusher 58. The residual water in the raw water tank 50 is discharged in every ice making cycle.

Figure 3:
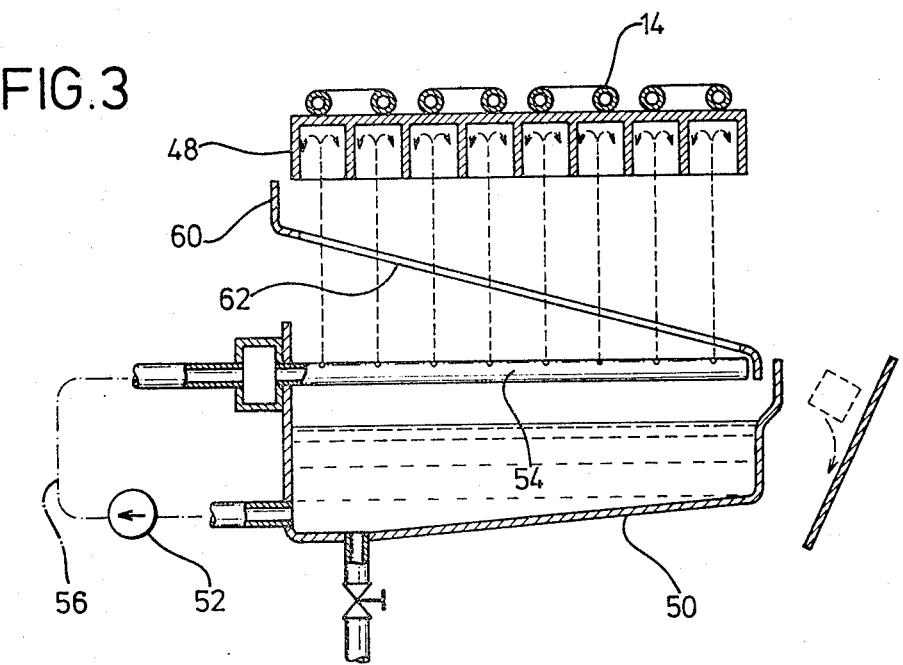

The ice making machine as illustrated in FIG. 3 comprises a freezing chamber 48 having a number of ice making cells opened in the downward direction, and a water tank 50 for storing the raw water of a predetermined quantity. The raw water is supplied from the raw water tank 50 to the freezing chamber 48 through a water circulation system 56 including a pump 52 and an injection nozzle 54. To remove the formed ice from the cells, a hot gas is passed through the evaporator 14 to drop the formed cubic ice onto a receptacle 60 positioned at an inclination under the freezing chamber 48. The receptacle 60 is provided with slits 62 which permit passing of the water injected through the injection nozzle 54.

In another embodiment of the ice making mechanism as illustrated in FIG. 4, the freezing plate 48 having a number of ice making cells opened in the downwardly tilting direction is vertically disposed and provided with a nozzle 54 for dispersing the raw water to the top of the freezing plate 48 and the raw water stored in the tank 50 disposed under the freezing plate 48 is supplied through a pump 52 to the dispersion nozzle 54 for the down streaming of the raw water over each of the cells of the freezing plate 48 with growth of the ice in the cell while the residual water being circulated into the water tank 50 thereby to provide a water circulation system 56. To remove the formed ice from each cell, a hot gass is passed through the evaporator 14 to drop the cubic ice by its gravity in the downward direction.

Further, the ice making mechanism as illustrated in FIG. 5 is comprised of a freezing chamber 48, a water tank 50 and a water circulation system 56 as shown in FIG. 3 and upon removal of the formed ice from the freezing plate, a hot gas is passed through the evaporator 14 to drop the cubic ice by tilting a bottom pan of the freezing chamber 48 while discharging the residual water in the water tank 50 through a drain pan 63.

Analysis of pure water obtained in accordance with the present invention as compared with raw water is mentioned below.

| Objectives | Raw Water | Pure Water | Rate of Elimination |
|---|---|---|---|
| Nitric ion | 46ppm | less than 0.4ppm | 99% |
| Chloride ion | 200ppm | less than 3ppm | 98.5% |
| Potassium permangnate | 9.5ppm | 0.5ppm | 94.7% |
| Fluorine | 0.7ppm | less than 0.1ppm | 85.7% |
| Evaporated residue | 410ppm | 5ppm | 98.7% |
| Iron | 3.83ppm | 0.04ppm | 98.9% |
| Bacteria | .14/ml | 0/ml | 100% |
| Hardness | 14 | 5 | Softened |

Figure 6:
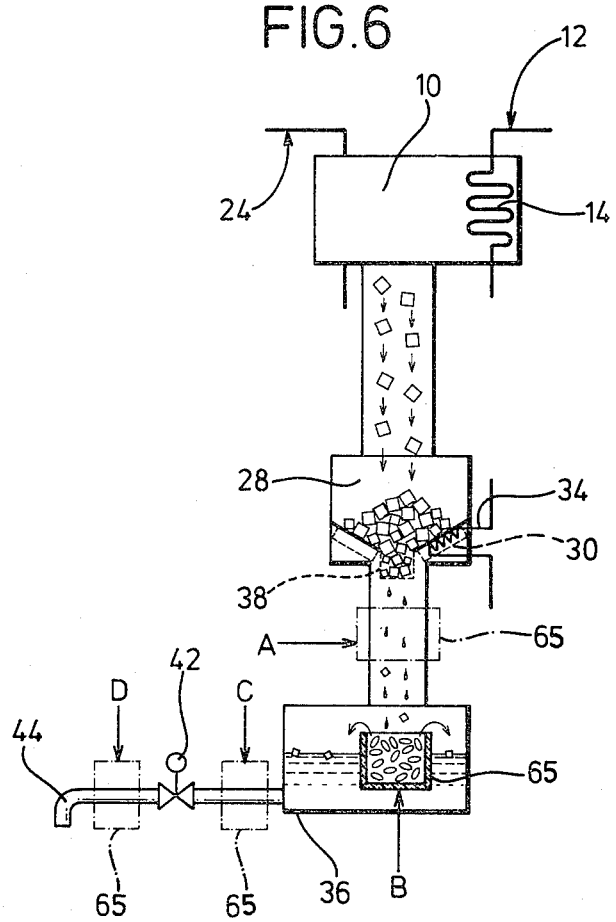

From FIG. 6, it will be appreciated that a nutritious substance bed 65 containing grannular, fibrous, segmental or powder material may be disposed at the positions A, B, C, or D, i.e. in front of, in or behind the pure water storing tank 36 to have the pure water impregnated with nutritious substances such as calcium, magnesium, potassium and the like. Otherwise, liquid nitritious material may be dripped into the pure water.

From the explanation hereinbefore described, it will be appreciated that any kind of water such as rainwater, river water, pond water and lake water may be used in the apparatus according to the invention and the apparatus may be conveniently installed in every water supply system.

While certain preferred embodiments of the invention have been illustrated by way of example in the drawings and particularly described, it will be understood that various modifications may be made in the methods and constructions and that the invention is no way limited to the embodiments shown.

What is claimed is:

1. In an apparatus for preparing pure water which includes:

an ice making mechanism having a fixed freezing surface for forming ice thereon;

means for flowing raw water obtained from a water source over said fixed freezing surface at a rate sufficient to cause a pure ice mass to gradually grow on said freezing surface while said flowing raw water carries away the impurities which remain from the portion of the raw water which has been frozen;

means for releasing the thus grown ice mass from said freezing surface by heating said freezing surface and for harvesting said released ice separately from the unfrozen portion of the raw water;

a raw water collecting tank means for collecting raw water from said freezing surface and for recirculating raw water to said freezing surface;

means for directly receiving and storing ice from said harvesting means; and a pure water tank for receiving and storing pure water obtained from the melting of the ice, the improvements according to which:

said fixed freezing surface is positioned to permit ice formed thereon to fall by gravity when said freezing surface is heated for releasing the ice from said freezing surface, said releasing and harvesting means comprises means for producing the harvested ice in the form of angular pieces which are relatively small in relation to the size of said receiving and storing means, and permitting the harvested ice to continue to fall by gravity, the receiving and storing means is located beneath said ice making mechanism and said harvesting means in perpendicularly aligned relation for directly receiving and storing the angular pieces of ice falling by gravity from said harvesting means, said receiving and storing means includes means structurally associated therewith for at least partially melting the ice in said storing means, said receiving and storing means has in the bottom portion thereof means permitting pure water produced by the melting of the ice and part of the ice to fall downwardly; and said pure water tank is located immediately below said receiving and storing means and said fall permitting means for directly receiving and storing at a prescribed low temperature said part of the ice along with the pure water.

2. The apparatus according to claim 1, wherein the ice making mechanism includes a refrigerant system which comprises an evaporator in association with said freezing surface, a single compressor, a first condensor and a second condensor all connected in series, said second condensor being located in association with said means for storing said ice mass to simultaneously cause melting of the ice therein and condensation of the refrigerant.

3. The apparatus according to claim 1, wherein said ice storage means includes means for removing ice mass when desired.

4. An apparatus for preparing pure water as claimed in claim 1, wherein said pure water tank is located at a lower level than said raw water collecting tank and the apparatus further comprises means for discharging at least a portion of the water remaining in said raw water tank after the completion of each ice making cycle.

5. An apparatus for preparing pure water as claimed in claim 1, wherein said means for flowing the raw water onto said fixed freezing surface, comprises nozzle means directed to said fixed freezing surface for discharging the raw water onto said surface, said raw water collecting tank means comprising a raw water collecting tank positioned under said nozzle means, and pump means connected to said tank and said nozzle means for circulating raw water from said raw water collecting tank to said nozzle means.

6. An apparatus according to claim 5, wherein said freezing surface comprises a plurality of cells, said cells being open in a downward direction, and said nozzle means being directed upwardly toward said cells.

7. An apparatus according to claim 1, wherein said means permitting the pure water and a part of the ice to fall downwardly comprises a cell extending below the bottom part of said storing means and into said pure water tank for holding ice for cooling the water collected in said pure water tank and over which the water from the melted ice in said storing means flows to said pure water tank.

* * * * *